(12) United States Patent
Kaneo (10) Patent No.: US 6,356,257 B1
(45) Date of Patent: Mar. 12, 2002

(54) INPUT DEVICE

(75) Inventor: Kazuo Kaneo, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/286,479

(22) Filed: Apr. 5, 1999

(30) Foreign Application Priority Data

Apr. 7, 1998 (JP) .......................................... 10-094609

(51) Int. Cl.⁷ ................................................ G09G 5/08
(52) U.S. Cl. ...................................... 345/161; 345/163
(58) Field of Search .................... 345/169, 156–163; 73/862.05; 524/141

(56) References Cited

U.S. PATENT DOCUMENTS

| | | | |
|---|---|---|---|
| 4,892,900 A | * 1/1990 | Sasaki et al. | 524/141 |
| 5,228,348 A | * 7/1993 | Fridgiere | 73/862.05 |
| 5,473,347 A | * 12/1995 | Collas et al. | 345/169 |
| 5,489,900 A | 2/1996 | Cali et al. | |
| 5,521,596 A | 5/1996 | Selkar et al. | |
| 5,754,167 A | 5/1998 | Narusawa et al. | |

FOREIGN PATENT DOCUMENTS

JP  2584201  2/1997

* cited by examiner

*Primary Examiner*—Steven Saras
*Assistant Examiner*—Srilakshmi Kumar
(74) *Attorney, Agent, or Firm*—Brinks Hofer Gilson & Lione

(57) ABSTRACT

Disclosed is an input device in which a control member is molded by injecting a liquid synthetic resin from an inlet of a mold formed at a position corresponding to the top of a control portion. The inlet is positioned at about the center of the control member, and the synthetic resin flows from the control portion having a relatively large thickness to beam portions and base portions that have a relatively small thickness. This allows smooth flow of the synthetic resin, and ensures consistently high quality and high precision of the control member. Moreover, fiber orientation is made uniform in the beam portions and the base portions, which gives good bending characteristics to the beam portions.

4 Claims, 11 Drawing Sheets

INPUT DEVICE

BACKGROUND OF THE INVENTION

1. Field of the Invention

The present invention relates to an input device using strain gages, which is suitable for use in a computer or the like.

2. Description of the Related Art

Figure 21:
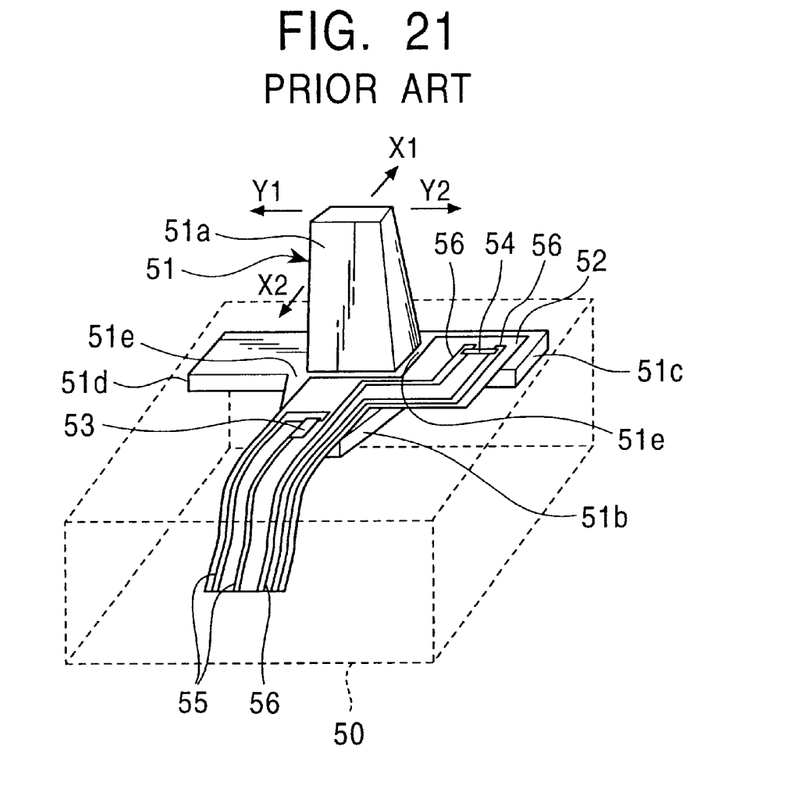
FIG. 21 is a perspective view of a conventional input device.

In a conventional input device using strain gages, as shown in FIG. 21, a control member 51, which is made of a flexible synthetic resin of polyphenylene ether, comprises a prismatic control portion 51a, three platelike base portions 51b, 51c, and 51d radially extending from the bottom of the control portion 51a at right angles to one another, and a linking portion 51e for linking the three base portions 51b, 51c, and 51d at the bottom of the control portion 51a. This control member 51 is mounted by an appropriate means on a frame 50 of a keyboard used in a computer.

When the control portion 51a of the control member 51 is tilted down in the X1-, X2-, Y1-, and Y2-directions, the base portions 51b, 51c, and 51d are correspondingly bent. The amount of bending changes according to the amount of tilting of the control portion 51a.

Such a control member 51 is produced by molding. A mold is prepared which includes a space portion that conforms to the shape of the control member 51, and an inlet C that is formed at a position corresponding to the end of the base portion 51c (see FIG. 21), and a liquid synthetic resin is injected from the inlet C into the space portion.

A flexible substrate 52 made of polyester has, on one side thereof, two strain gages 53 and 54 formed of resistors, and lead wires 55 and 56 printed in a conductive ink of sliver so as to be connected to the strain gages 53 and 54.

The opposite side of the flexible substrate 52 from the side where the strain gages 53 and 54 are formed is partly and directly bonded by an adhesive onto the upper surfaces of the base portions 51b and 51c that are arranged at right angles, so that one of the strain gages 53 is positioned on the base portion 51b, and the other strain gage 54 is positioned on the base portion 51c.

During operation of such an input device, when the control portion 51a of the control member 51 is tilted down in the X1-direction, the upper side of the base portion 51b is bent to stretch, and the strain gage 53 thereon is also stretched, thereby increasing the resistance. When the control portion 51a is tilted down in the X2-direction, the upper side of the base portion 51b is bent to be compressed, and the strain gage 53 thereon is also compressed, thereby decreasing the resistance.

In contrast, when the control portion 51a is tilted down in the Y1-direction, the resistance of the strain gage 54 increases on the same principle as above. When the control portion 51a is tilted down in the Y2-direction, the resistance of the strain gage 54 decreases.

Figure 22:
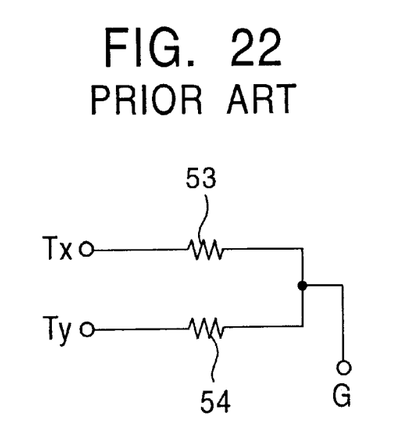
FIG. 22 is a circuit diagram of a voltage detecting circuit in the conventional input device.

FIG. 22 is a circuit diagram of a voltage detecting circuit in the conventional input device. The strain gages 53 and 54 are connected at one end, and are further connected to the ground G. The other ends of the strain gages 53 and 54 are connected to a terminal Tx and a terminal Ty, respectively, from which the voltage divided by a resistive potential divider in the circuit is output. The above-described change in resistance is detected as a change in voltage, and the computer reads the voltage change and controls a cursor so that the cursor moves vertically or horizontally in response to the movement of the control portion 51a in the X1- and X2-directions, or in the Y1- and Y2-directions.

As described above, the control member 51 of the conventional input device is produced by molding in which a liquid synthetic resin is injected from the inlet C of the mold at a position corresponding to the end of the base portion 51c. Therefore, the liquid synthetic resin does not flow smoothly during molding. In particular, it is impossible to give the same thickness to the base portions 51b, 51c, and 51d, which lowers accuracy.

Furthermore, since the control member 51 is made of a synthetic resin of polyphenylene ether, the creep property of the base portion 51b is undesirable, and accurate bending is impossible. In addition, the control member 51 has a low heat resistance, and therefore, is not suitable for use in high-temperature environments.

SUMMARY OF THE INVENTION

Accordingly, it is an object of the present invention to provide an input device in which a plurality of strain gages have identical characteristics, in particular, when glass fiber is used.

In order to achieve the above object, according to an aspect of the present invention, there is provided an input device including a control member having a control portion, a plurality of beam portions connected at one end to the control portion so as to extend perpendicularly to the axis of the control portion, and a flat base portion connected to the other end of the beam portions; and a strain gage disposed on the beam portions, wherein the control member is formed by molding with the top end of the control portion used as an inlet.

Preferably, the control member is made of a synthetic resin containing glass fiber.

According to another aspect of the present invention, there is provided an input device including a control member having a control portion, and a plurality of base portions connected at one end to the control portion so as to extend perpendicularly to the axis of the control portion; and a strain gage disposed on the base portions, wherein the control member is formed by molding with the top end of the control portion used as an inlet.

Preferably, the control member is made of a synthetic resin containing glass fiber.

Further objects, features, and advantages of the present invention will become apparent from the following description of the preferred embodiments with reference to the attached drawings.

DESCRIPTION OF THE PREFERRED EMBODIMENT

Figure 1:
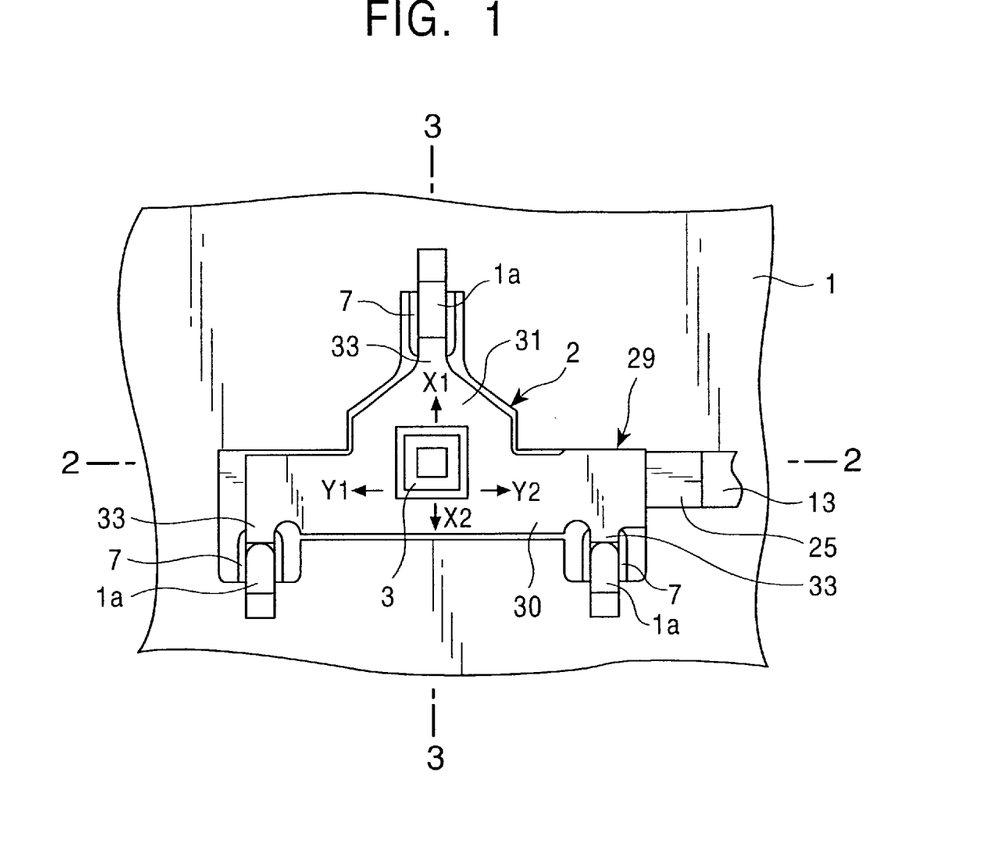
FIG. 1 is a plan view of an input device according to the present invention.
Figure 2:
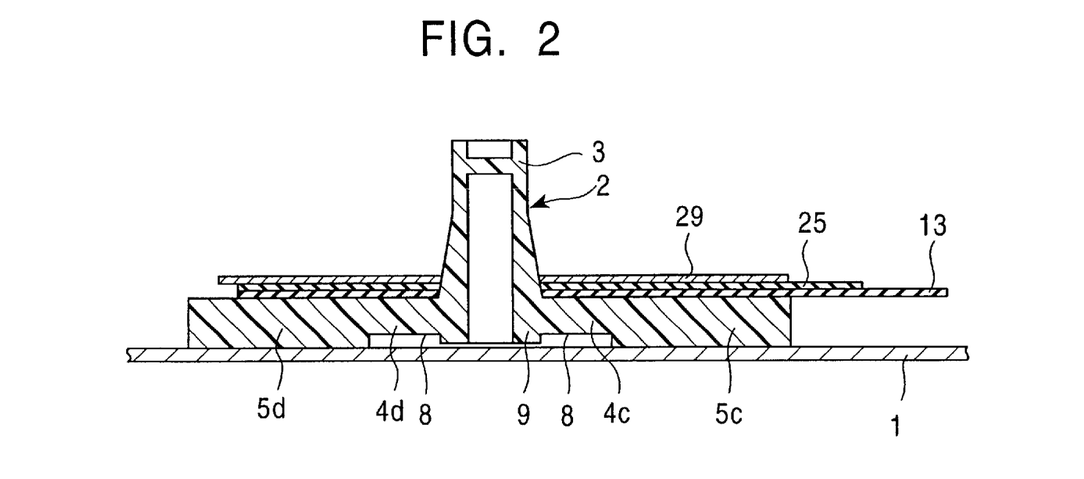
FIG. 2 is a sectional view taken along line 2—2 of FIG. 1.
Figure 3:
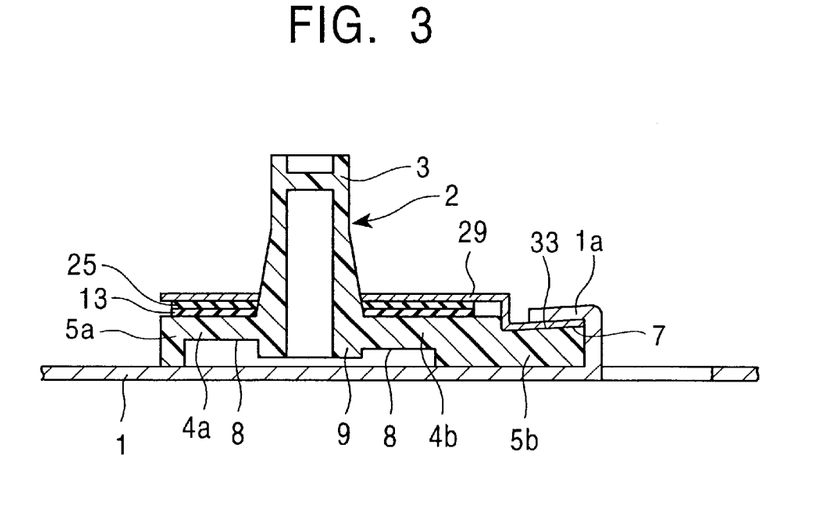
FIG. 3 is a sectional view taken along line 3—3 of FIG. 1.
Figure 4:
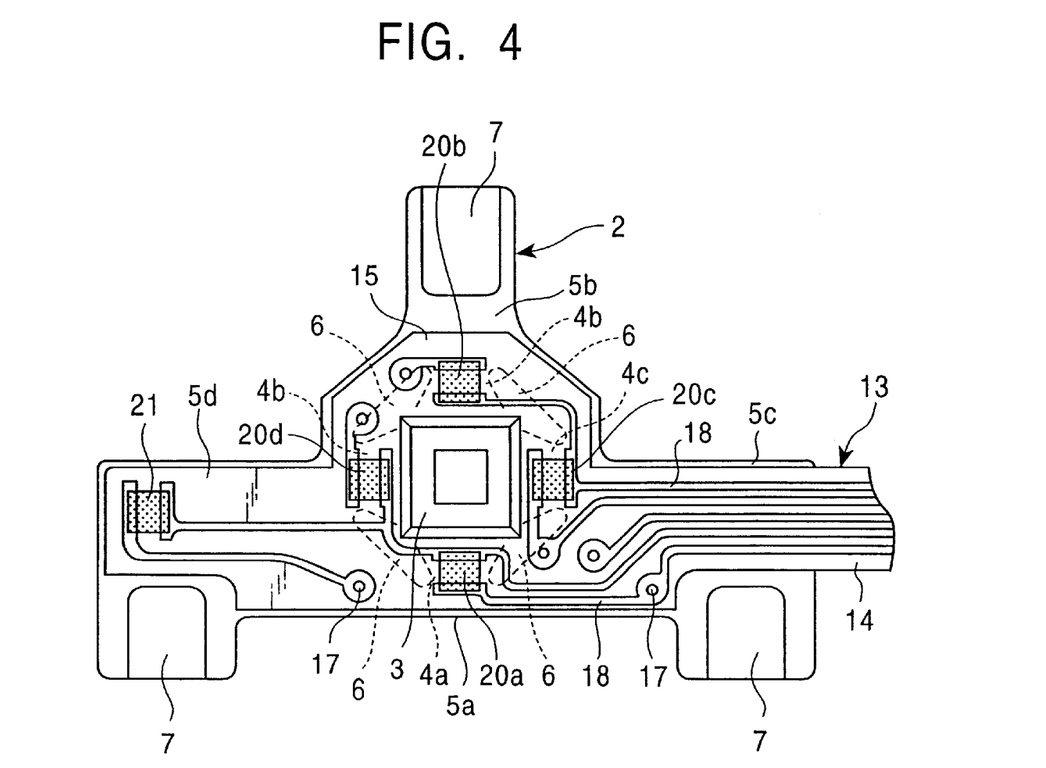
FIG. 4 is a plan view showing a combination of a control member and a flexible substrate in the input device of the present invention.
Figure 5:
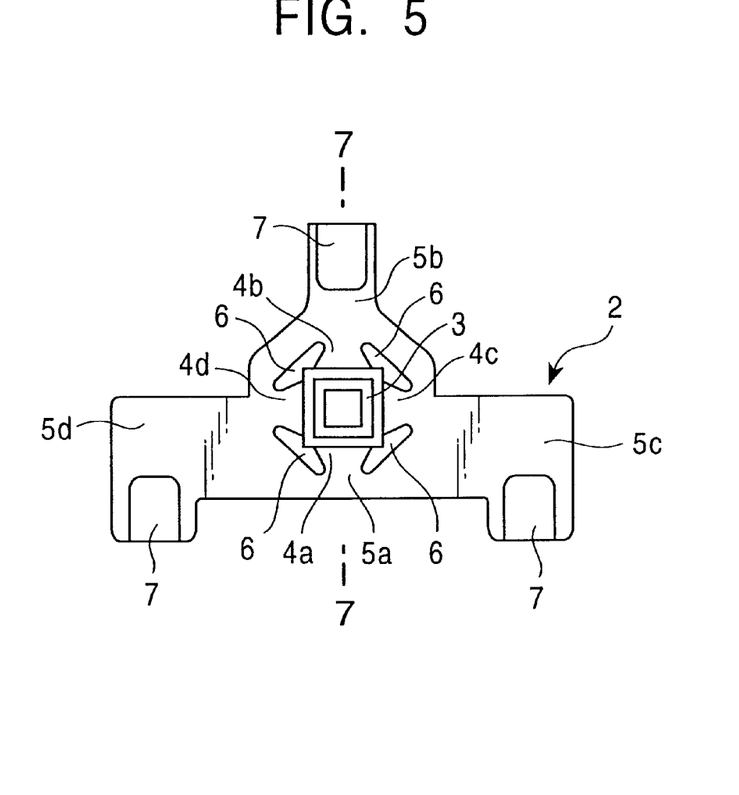
FIG. 5 is a plan view of the control member in the input device.
Figure 6:
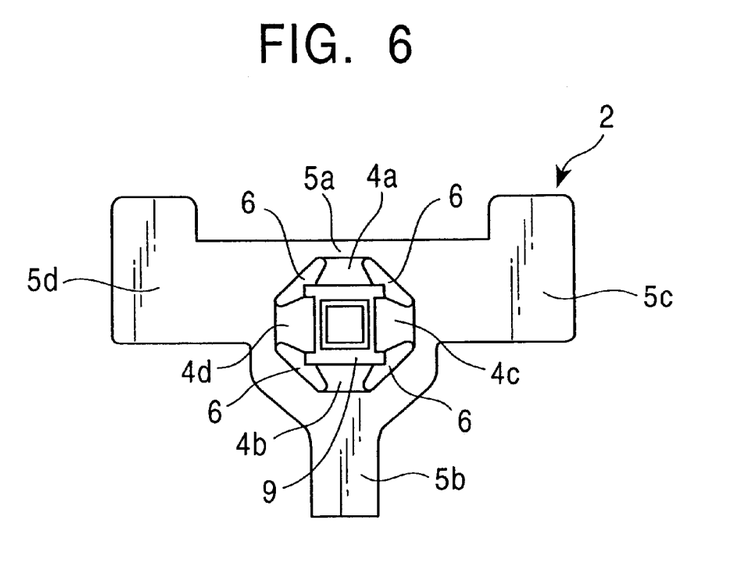
FIG. 6 is a bottom view of the control member.
Figure 8:
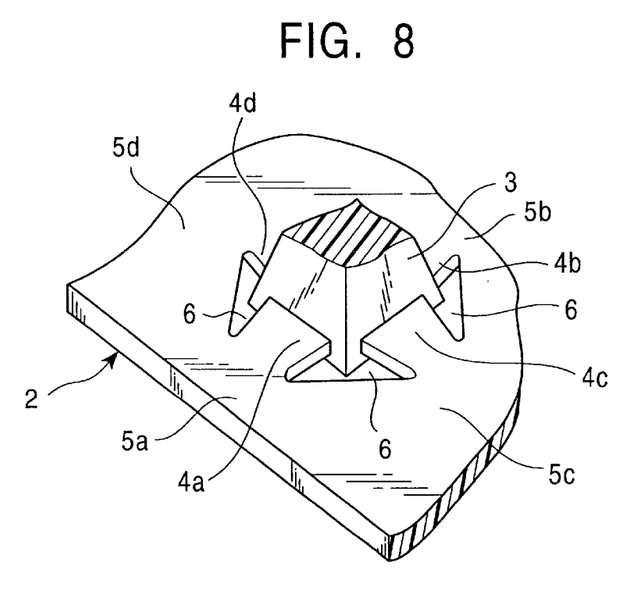
FIG. 8 is a perspective view showing the principal part of the control member.
Figure 9:
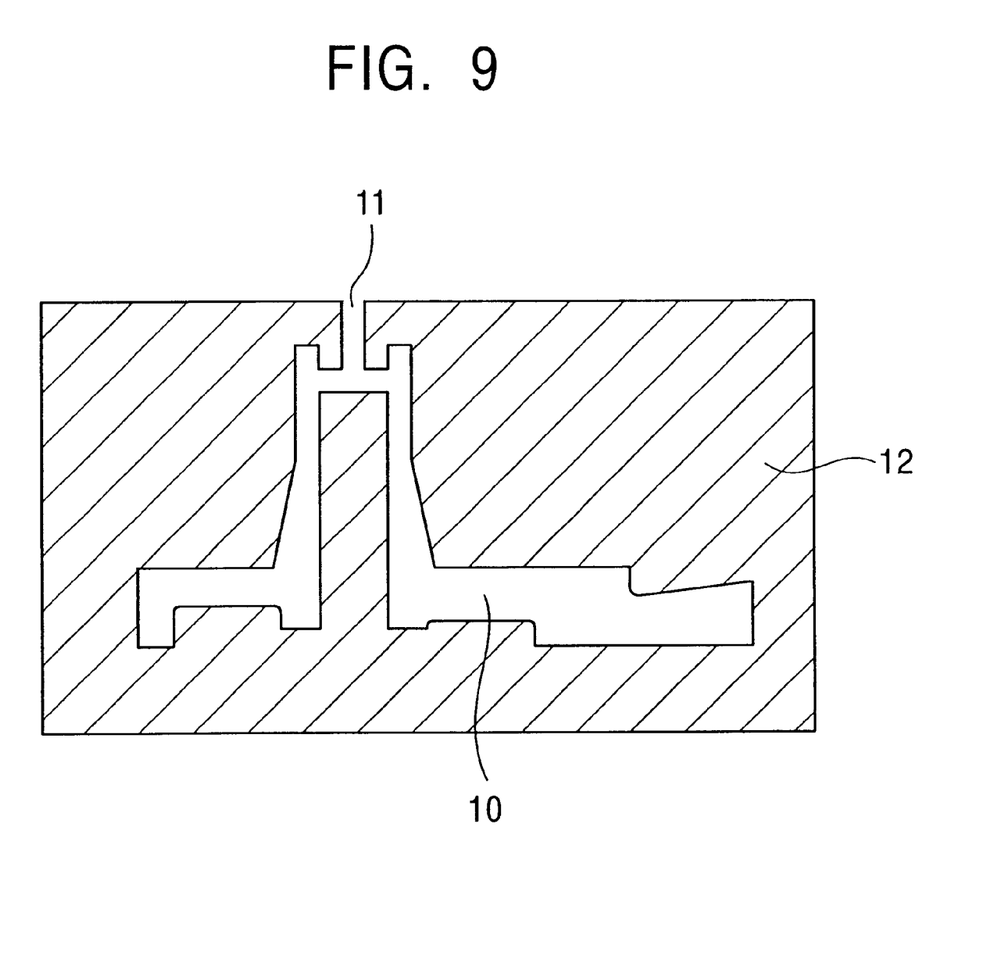
FIG. 9 is an explanatory view illustrating the production of the control member.
Figure 10:
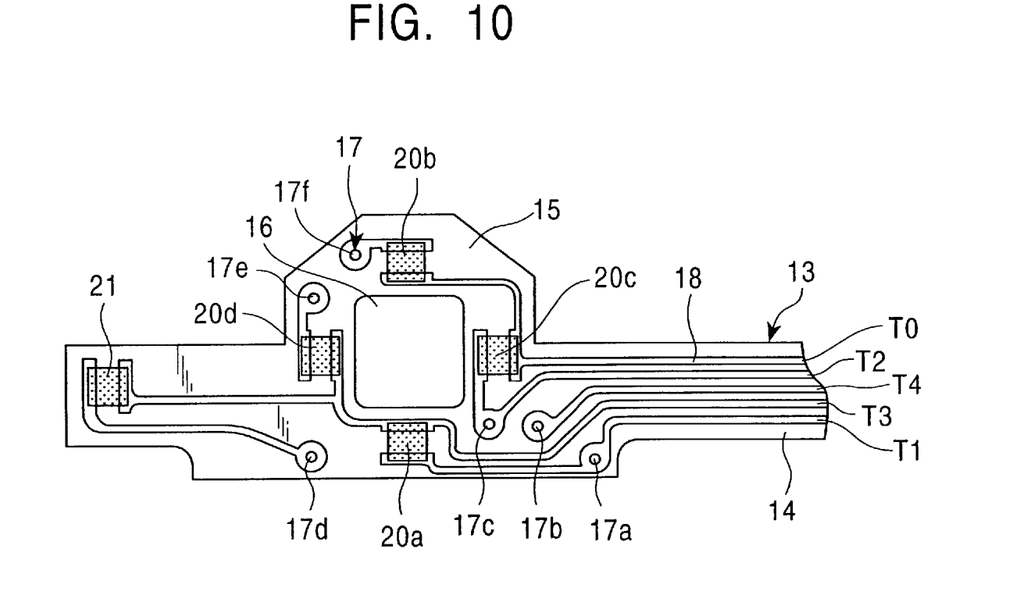
FIG. 10 is a plan view of the flexible substrate in the input device of the present invention.
Figure 11:
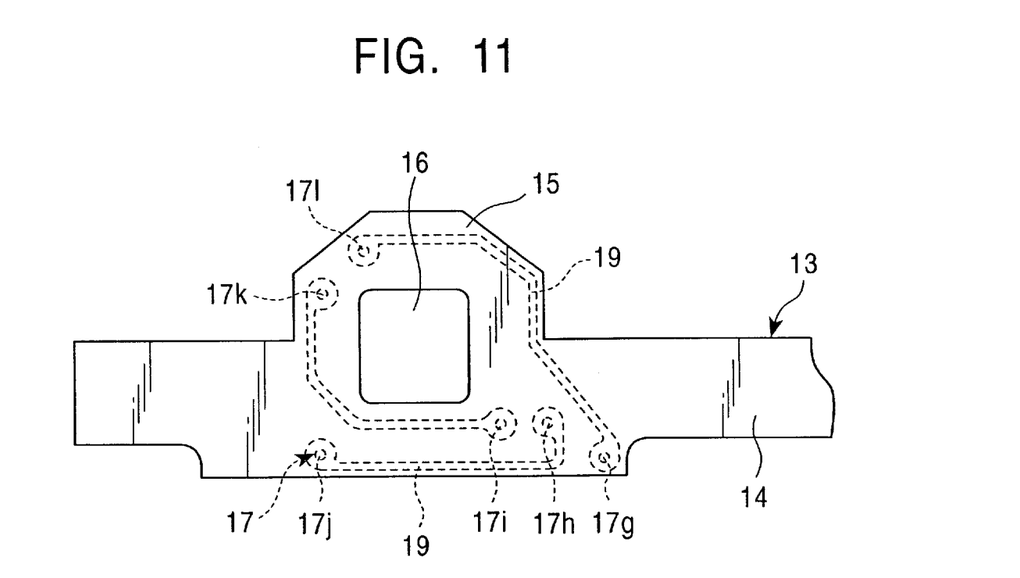
FIG. 11 is an explanatory view showing the wiring on the flexible substrate.
Figure 17:
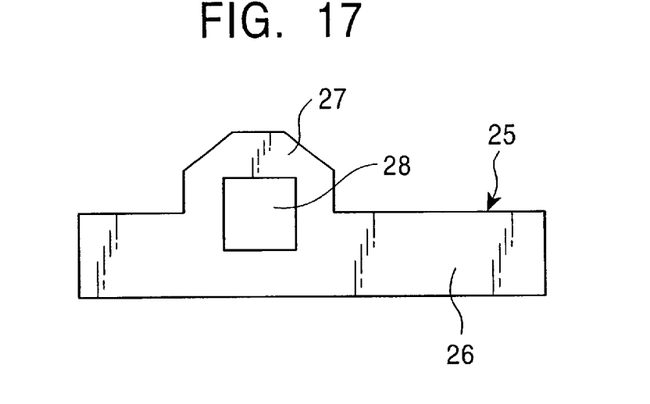
FIG. 17 is a plan view of an insulating plate in the input device of the present invention.
Figure 18:
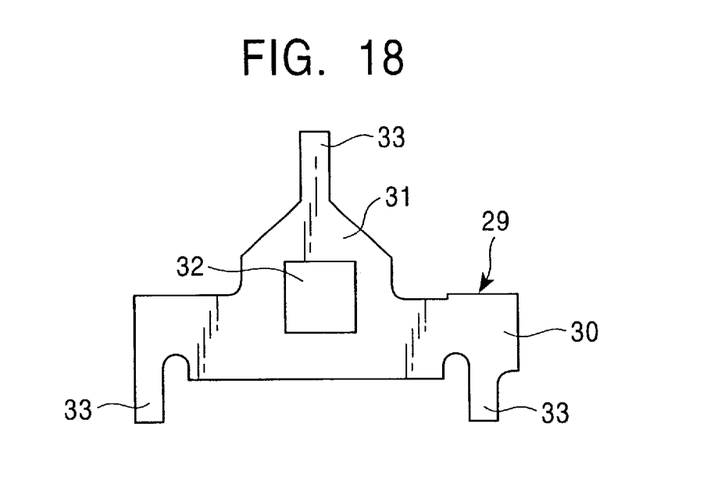
FIG. 18 is a plan view of a shielding plate in the input device of the present invention.
Figure 19:
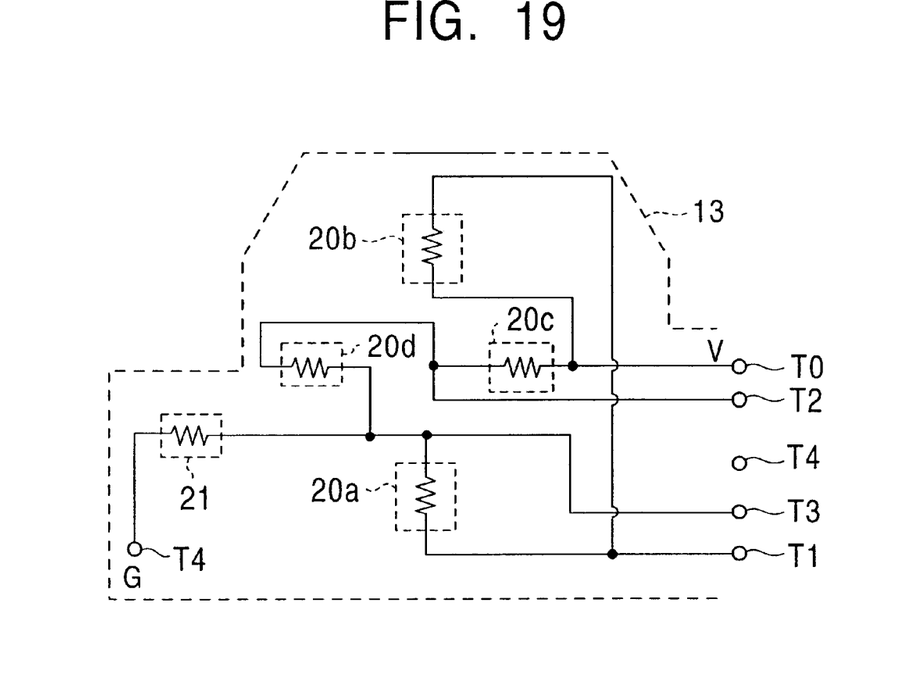
FIG. 19 is an illustrative circuit diagram of a voltage detecting circuit in the input device of the present invention.
Figure 20:
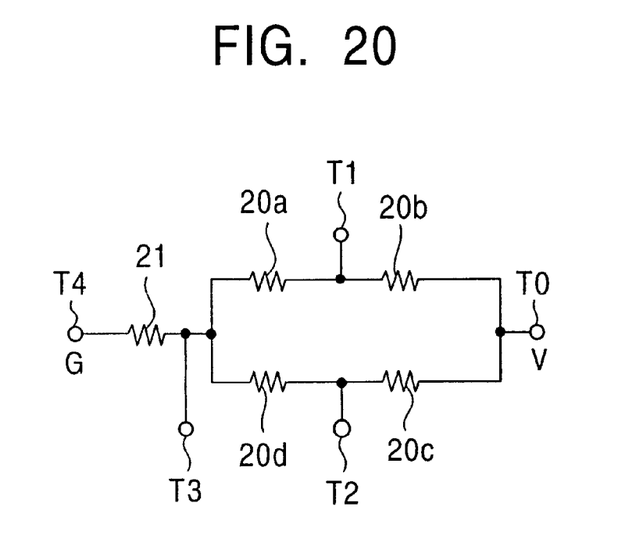
FIG. 20 is a formal circuit diagram in the input device of the present invention.

An input device using strain gages according to an embodiment of the present invention will be now described with reference to FIGS. 1 to 20. FIG. 1 is a plan view of an input device of this embodiment, FIG. 2 is a sectional view taken along line 2—2 of FIG. 1, FIG. 3 is a sectional view taken along line 3—3 of FIG. 1, FIG. 4 is a plan view showing a combination of a control member and a flexible substrate, FIG. 5 is a plan view of the control member, FIG. 6 is a bottom view of the control member, FIG. 7 is a sectional view taken along line 7—7 of FIG. 5, FIG. 8 is a perspective view showing the principal part of the control member, FIG. 9 is an explanatory view illustrating the production of the control member, FIG. 10 is a plan view of the flexible substrate, FIG. 11 is an explanatory view showing the wiring on the flexible substrate, FIGS. 12 to 16 are explanatory views illustrating the production of the flexible substrate, FIG. 17 is a plan view of an insulating plate, FIG. 18 is a plan view of a shielding plate, FIG. 19 is an illustrative circuit diagram of a voltage detecting circuit in the input device, and FIG. 20 is a formal circuit diagram in the input device.

In the input device of this embodiment, a mounting plate 1 that constitutes a frame of a keyboard or the like is formed by a metal plate having a relatively large thickness, and is provided with a plurality of bendable tongues 1a formed by louvering.

A flexible control member 2 is molded from a synthetic resin such as polyphenylene ether or a synthetic resin containing glass fiber (modified polyphenylene ether). As is particularly shown in FIGS. 5 to 8, the control member 2 comprises a prismatic control portion 3 having a cavity therein; four beam portions 4a, 4b, 4c, and 4d that are connected at one end to the bottom of the control portion 3 and that are arranged at right angles to one another in the form of a cross so as to radially extend perpendicularly to the axis of the control portion 3; platelike base portions 5a, 5b, 5c, and 5d that are connected to the other ends of the beam portions 4a, 4b, 4c, and 4d and that radially extend so that the upper surfaces thereof are flush with the beam portions 4a, 4b, 4c, and 4d; triangular holes 6 formed at the corners of the control portion 3 so as to separate the adjoining beam portions 4a, 4b, 4c, and 4d; and recesses 7 formed at three points on the upper surfaces of the base portions.

Figure 7:
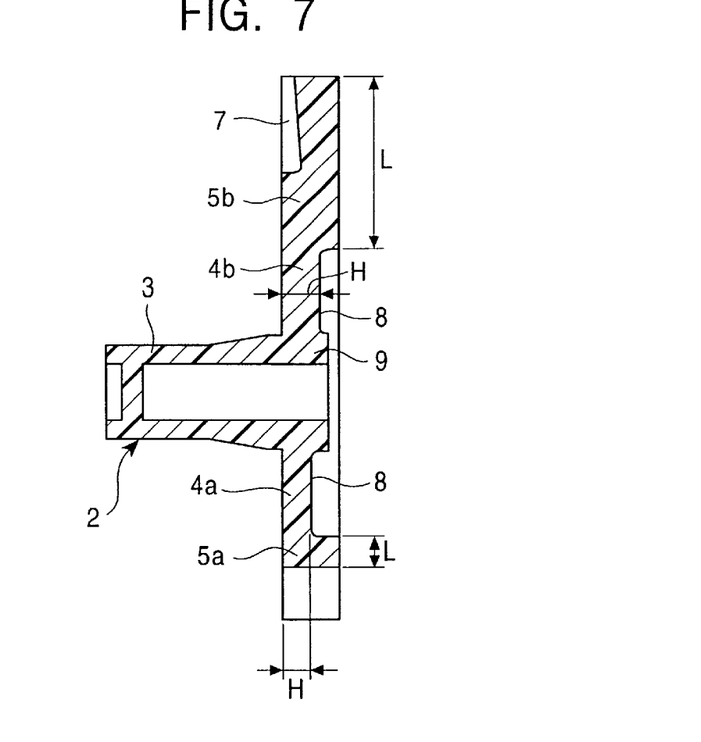
FIG. 7 is a sectional view taken along line 7—7 of FIG. 5.

Referring to FIG. 7, the lengths L of the base portions 5a, 5b, 5c, and 5d, that is, the lengths L from the portions connected to the corresponding beam portions 4a, 4b, 4c, and 4d to the end portions, are different, because the mounting position of the control member 2 on the mounting plate 1 is limited by parts incorporated in the keyboard or the like. In accordance with the lengths L of the base portions 5a, 5b, 5c, and 5d, the thicknesses H of the beam portions 4a, 4b, 4c, and 4d connected thereto are made different by forming depressions 8 on the lower side of the beam portions 4a, 4b, 4c, and 4d.

The thicknesses H of the beam portions 4a, 4b, 4c, and 4d are set so that the beam portion connected to the base portion having a large length L has a small thickness and so that the beam portion connected to the base portion having a small length L has a large thickness. In this embodiment, the thickness H decreases in the order, the beam portion 4a, the beam portion 4b, and the beam portions 4c and 4d. The beam portions 4c and 4d have the same thickness. One pair of beam portions 4a and 4b, which are opposed to each other across the control portion 3, have a higher thickness than that of the other pair of beam portions 4c and 4d that are also opposed to each other across the control portion 3.

The control portion 3 can be tilted down in the directions of the arrows X1, X2, Y1, and Y2, as shown in FIG. 1. The beam portion 4a, 4b, 4c, or 4d is bent in accordance with the tilting so that the upper surface thereof stretches or is compressed. When the control portion 3 is tilted at a fixed angle, the beam portion connected to the base portion having a small length L is bent more than the beam portion connected to the base portion having a large length L. Such differences in the degree of bending among the beam portions 4a, 4b, 4c, and 4d due to the differences in length among the base portions 5a, 5b, 5c, and 5d can be eliminated by changing the thicknesses H of the beam portions 4a, 4b, 4c, and 4d according to the lengths L of the base portions 5a, 5b, 5c, and 5d, as described above, whereby all the beam portions 4a, 4b, 4c, and 4d can be uniformly bent.

Furthermore, the holes 6 formed between the beam portions 4a, 4b, 4c, and 4d allow the beam portions to be individually bent without any influence of the adjoining beam portions when the control portion 3 is tilted.

The beam portions 4a, 4b, 4c, and 4d are shaped like a trapezoid so that they are wide on the side connected to the control portion 3 and are narrow on the side connected to the base portions 5a, 5b, 5c, and 5d, as shown in FIGS. 5, 6, and 8. This prevents the beam portion on the side of the control portion 3 from being bent more than on the side of the base portion when the control portion 3 is tilted, and allows the entire beam portion to be uniformly bent.

The control member 2 has a projection 9 on the lower side at a position corresponding to the control portion 3. When the control member 2 is mounted on the mounting plate 1 so that the flat lower surfaces of the base portions 5a, 5b, 5c, and 5d are laid on the mounting plate 1, as shown in FIGS. 2 and 3, the projection 9 is placed close to the mounting plate 1, and makes contact with the mounting plate 1 when the control portion 3 is tilted, thereby preventing the control portion 3 from suddenly falling.

While the beam portions 4a, 4b, 4c, and 4d are formed in the shape of a cross by forming the four holes 6 in this embodiment, for example, two beam portions may be crossed at right angles.

The above-described control member 2 is produced by molding. In molding, a mold 12 is prepared which includes a space portion 10 that conforms to the shape of the control member 2, and an inlet 11 formed at a position corresponding to the top of the control portion 3 so as to communicate with the space portion 10, as shown in FIG. 9, and a liquid synthetic resin or a synthetic resin containing glass fiber is injected from the inlet 11 into the space portion 10.

When the control member 2 is thus molded by injecting a liquid synthetic resin or a synthetic resin containing glass fiber from the position corresponding to the top of the control portion 3, the inlet 11 is positioned at about the center of the control member 2, and the synthetic resin flows from the control portion 3 having a relatively large thickness to the beam portions 4a, 4b, 4c, and 4d and the base portions 5a, 5b, 5c and 5d that have a relatively small thickness. This allows smooth flow of the synthetic resin, and ensures consistently high quality and high precision of the control member 2. Moreover, fiber orientation is made uniform in the beam portions 4a, 4b, 4c, and 4d and the base portions 5a, 5b, 5c, and 5d, which gives good bending characteristics to the beam portions 4a, 4b, 4c, and 4d.

A film-like flexible substrate 13 made of an insulating material such as polyimide comprises, as is particularly shown in FIGS. 10 to 16, a belt portion 14, a rectangular extended portion 15 projecting from the side of the belt portion 14, a square hole 16 formed over the belt portion 14 and the extended portion 15, and a plurality of through holes 17 formed around the hole 16 in the belt portion 14 and the extended portion 15.

A conductive pattern 18 is printed using silver paste or the like on the upper surface of the flexible substrate 13, and connecting conductors 19 are also printed using silver paste or the like on the lower surface of the flexible substrate 13.

On the upper surface of the flexible substrate 13, strain gages 20a, 20b, 20c, and 20d formed of resistors printed in a resistive ink are arranged opposed to one another across the hole 16 and are respectively connected to the conductive pattern 18, and a resistor 21 serving as a sensing element is also printed in a resistive ink at a position far apart from these strain gages 20a, 20b, 20c, and 20d, and is connected to the conductive pattern 18 at both ends thereof.

The strain gages 20a, 20b, 20c, and 20d and the resistor 21 are appropriately connected by connecting the conductive pattern 18 and the connecting conductors 19 via conductors formed in the through holes 17.

Figure 16:
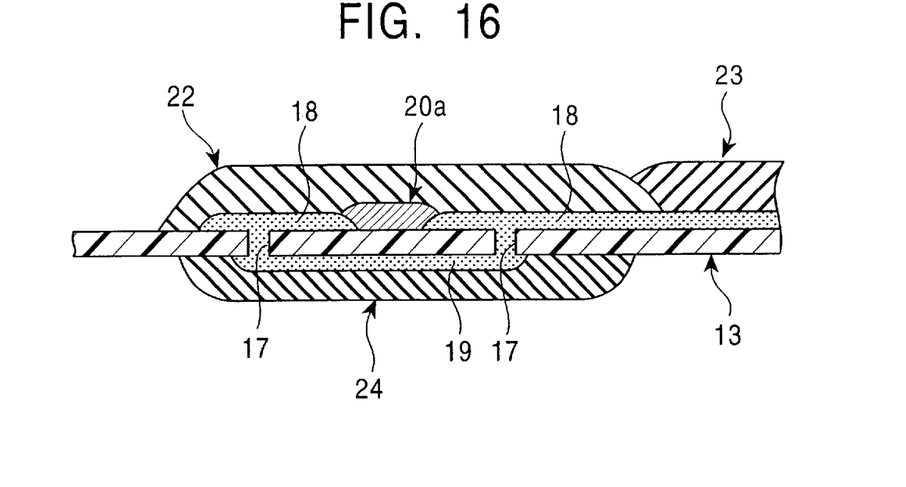

On the upper surface of the flexible substrate 13, as shown in FIG. 16, a cover portion 22 made of an insulating material is provided to cover and protect the strain gages 20a, 20b, 20c, and 20d, the resistor 21, a part of the conductive pattern 18 connecting the strain gages and the resistor, and a cover portion 23 made of an insulating material is provided to cover and protect a portion of the conductive pattern 18 leading to the outside. On the lower surface of the flexible substrate 13, a cover portion 24 made of an epoxy insulating material is provided to cover the extended portion 15, the belt portion 14, and the connecting conductors 19 that are arranged around the hole 16.

Next, a method of producing the flexible substrate 13, the strain gages 20a, 20b, 20c, and 20d, etc., will be described with reference to FIGS. 12 to 16.

Figure 12:
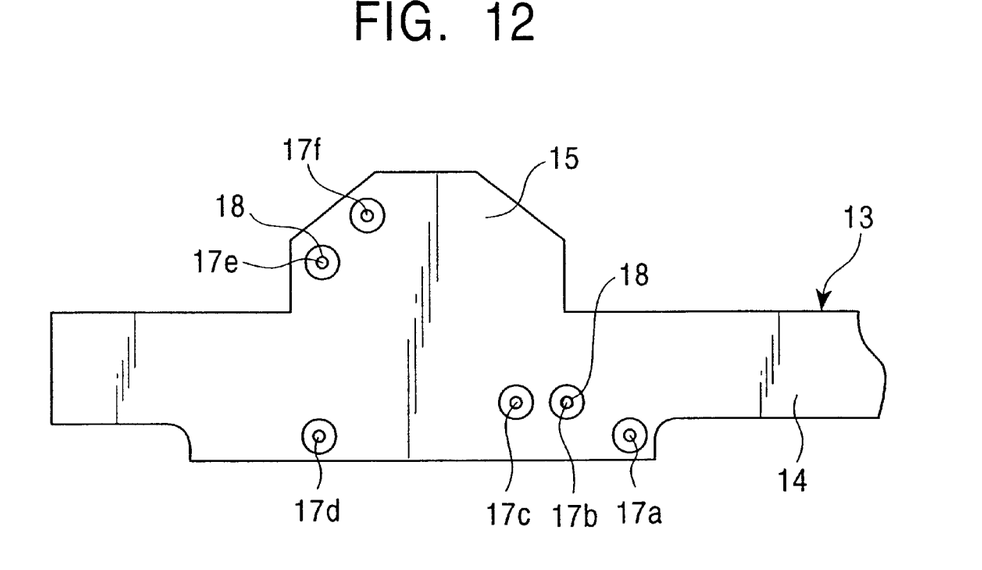
FIGS. 12 to 16 are explanatory views illustrating the production of the flexible substrate.

First, as shown in FIG. 12, land portions that form a part of the conductive pattern 18 are printed with silver paste on the upper surface of the flexible substrate 13, and the through holes 17 are formed in the flexible substrate 13.

Figure 13:
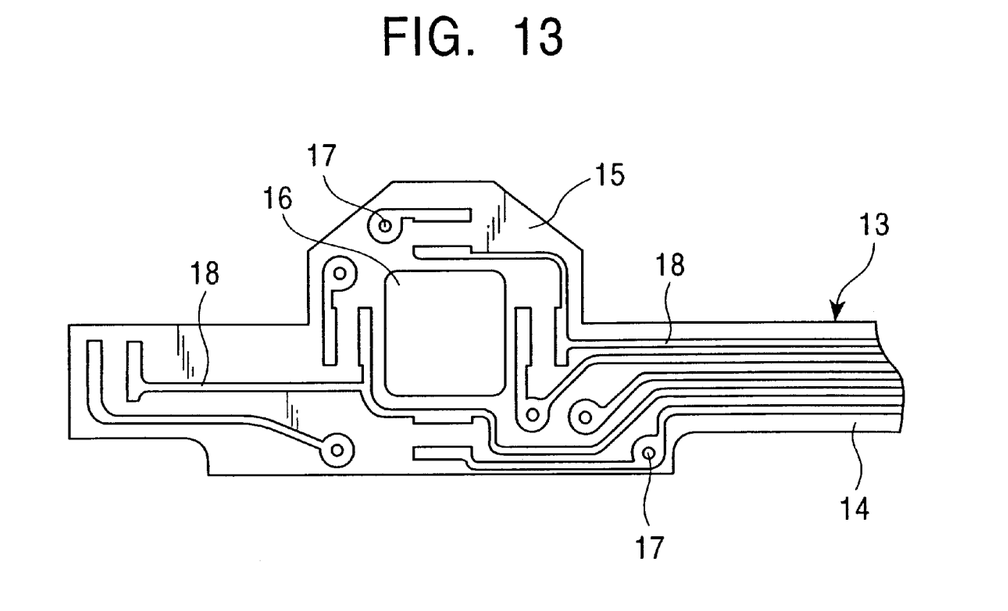

Next, as shown in FIG. 13, the entire conductive pattern 18 is printed with silver paste on the upper surface of the flexible substrate 13, and the hole 16 is formed in the flexible substrate 13 so as to pass the control portion 3 therethrough.

Figure 14:
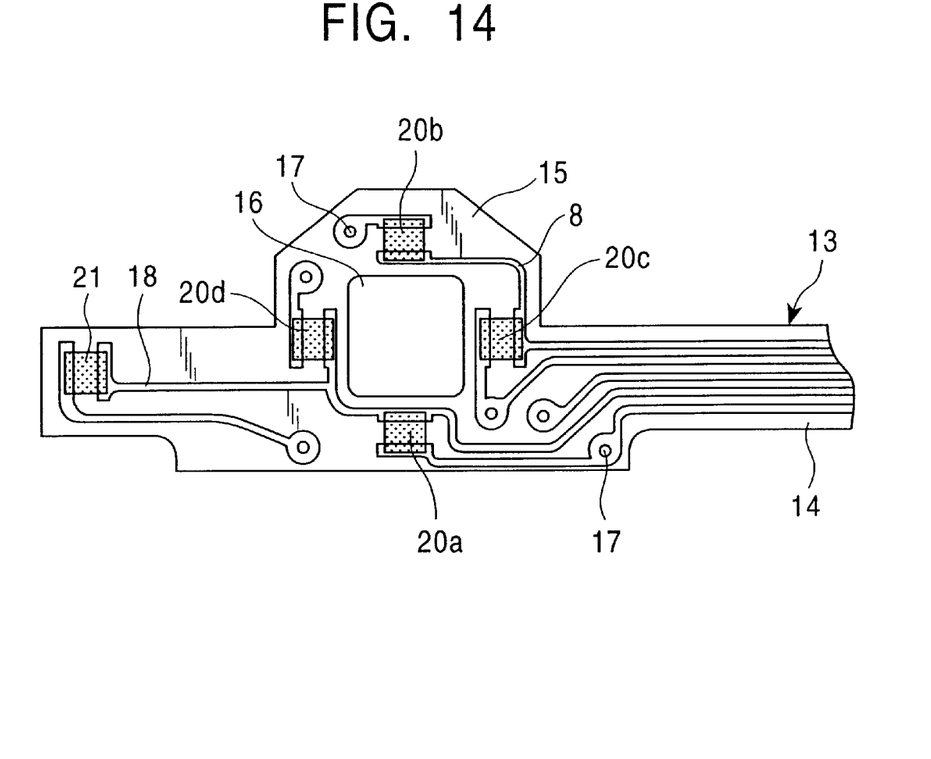

Next, as shown in FIG. 14, the strain gages 20a, 20b, 20c, and 20d, and the resistor 21 are printed in a resistive ink on the upper surface of the flexible substrate 13 so that they are connected to the conductive pattern 18.

Figure 15:
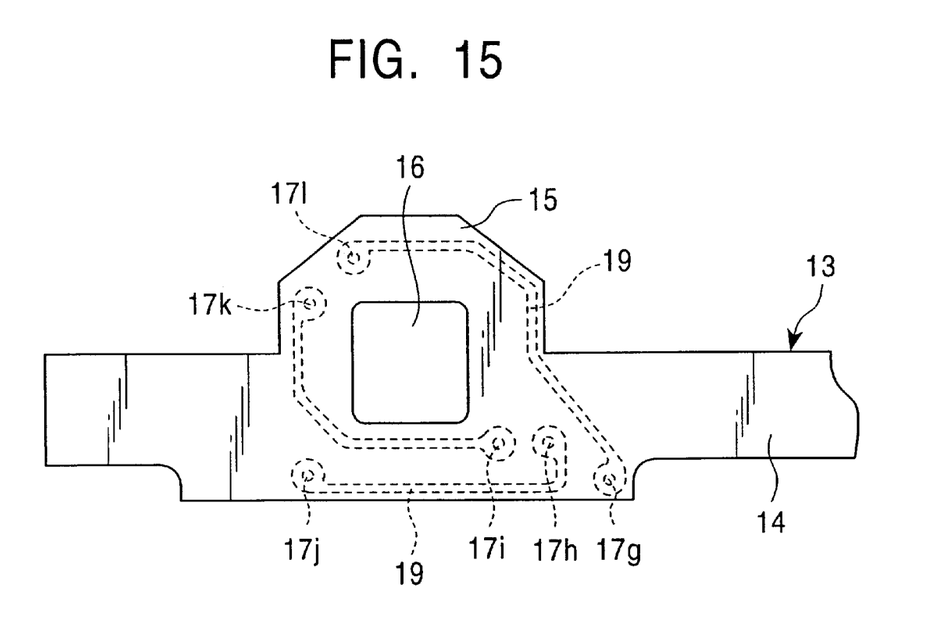

Next, as shown by dotted lines in FIG. 15, the connecting conductors 19 are printed with silver paste on the lower surface of the flexible substrate 13, and conductors of silver paste are formed in the through holes 17, thereby connecting the connecting conductors 19 on the lower surface and the conductive pattern 18 on the upper surface.

Next, as shown in FIG. 16, the cover portion 22 for covering the strain gages 20a, 20b, 20c, and 20d, the resistor 21, and a part of the conductive pattern 18 is printed with an insulating material on the upper surface of the flexible substrate 13. Then, the cover portion 23 for covering the lead portion of the conductive pattern 18 is printed with an insulating material on the upper surface of the flexible substrate 13. Finally, the cover portion 24 for covering the connecting conductors 19 is printed with an epoxy insulating material on the lower surface of the flexible substrate 13. The production of these members is thereby completed.

Regarding the circuit configuration of the input device according to the present invention, as shown in FIGS. 19 and 20, the strain gages 20a and 20b are connected in series, and the strain gages 20c and 20d are connected in series. The strain gages 20a and 20b in series are connected in parallel to the strain gages 20c and 20d in series.

The resistor 21 is disposed between a connected portion between the strain gages 20b and 20d, and the ground G. A voltage V is supplied from a connected portion between the strain gages 20a and 20c, the divided voltage is output from terminals T1 and T2, and a voltage that depends on the change in resistance of the resistor 21 is output from a terminal T3.

Since the resistances of the strain gages 20a, 20b, 20c, and 20d are initially set to be equal, the voltage at the terminal T1 and the voltage at the terminal T2 are just equal to the midpoint between the voltage at the terminal T3 and the voltage V.

For example, when the resistance of the strain gage 20a decreases and the resistance of the strain gage 20b increases, the voltage at the terminal T1 increases. An apparatus to which the input device is connected is thereby allowed to move the cursor in the X-axis direction.

Similarly, when the resistances of the strain gages 20c and 20d change, the voltage at the terminal T2 increases, and a voltage change is produced at the terminal T1 and the terminal T2, whereby the cursor can be moved in the Y-axis direction.

Furthermore, when the control portion 3 is pressed in the axial direction, since the resistance of the resistor 21 hardly changes in contrast to the changes in resistance of the strain gages 20a to 20d, the voltage at the terminal T3 changes. This allows the cursor to be controlled in response to the change in the Z-axis direction.

The flexible substrate 13 having such a configuration is bonded onto the upper surface of the control member 2, that is, on the upper surfaces of the beam portions 4a, 4b, 4c, and 4d and the base portions 5a, 5b, 5c, and 5d, by an epoxy adhesive applied to the epoxy cover portion 24 in a state in which the control portion 3 of the control member 2 is passed through the hole 16 thereof, as shown in FIGS. 2 to 4.

After bonding, the strain gages 20a, 20b, 20c, 20d, and the resistor 21 are positioned on the beam portions 4a, 4b, 4c, and 4d, and the base portion 5d, respectively.

While the four strain gages 20a, 20b, 20c, and 20d are used in this embodiment, only two of the strain gages 20a and 20c may be used.

A film-like insulating plate 25 made of an insulating material comprises a belt portion 26, an extended portion 27 projecting from the side of the belt portion 26, and a hole 28 formed over the belt portion 26 and the extended portion 27, as shown in FIG. 17.

As shown in FIGS. 2 and 3, the insulating plate 25 is laid on the flexible substrate 13 so that the control portion 3 of the control member 2 is passed through the hole 28, and is bonded to the cover portions 22 and 23 by an adhesive.

The insulating plate 25 may be simply laid on the flexible substrate 13 without being bonded by an adhesive.

When the insulating plate 25 is mounted on the flexible substrate 13, it covers the strain gages 20a, 20b, 20c, and 20d, the resistor 21, and a part of the conductive pattern 18 as well as the cover portions 22 and 23. Furthermore, a part of the belt portion 26 projects from the end of the base portion 5c, as shown in FIG. 2, so as to cover the lead portion of the conductive pattern 18 in the vicinity of the control portion 3.

A shielding plate 29 formed by a metal plate of aluminum foil or the like comprises a belt portion 30, an extended portion 31 projecting from the side of the belt portion 30, a hole 32 formed over the belt portion 30 and the extended portion 31, and three projections 33 formed in the belt portion 30 and the extended portion 31, as shown in FIG. 18.

As shown in FIGS. 1 to 3, the shielding plate 29 is laid on the insulating plate 25 or is bonded thereon by an adhesive so that the control portion 3 of the control member 2 is passed through the hole 32, thereby substantially covering the entire surface of the insulating plate 25 excluding a part of the belt portion 26, and positioning the projections 33 in the recesses 7 of the control member 2.

The shielding plate 29 may be previously bonded to the insulating plate 25, and may be mounted on the flexible substrate 13 by being fitted on the control portion 3 together with the insulating plate 25.

The control member 2 with the flexible substrate 13, the insulating plate 25, and the shielding plate 29 thus attached thereto is laid on the mounting plate 1, and the tongues 1a of the mounting plate 1 are bent toward the recesses 7 of the control member 2 so as to press the control member 2 with the projections 33 of the shielding plate 29, as shown in FIGS. 1 to 3.

In this case, the flat lower surfaces of the base portions 5a, 5b, 5c, and 5d of the control member 2 are placed on the mounting plate 1, and a small clearance is formed between the projection 9 and the mounting plate 1. The shielding plate 29 is connected to the tongues 1a so as to electrically shield the upper side of the conductive pattern 18 and the strain gages 20a, 20b, 20c, and 20d on the flexible substrate 13.

The input device of the present invention operates as follows. When the control portion 3 of the control member 2 is tilted down in the X1-direction, the upper side of the beam portion 4a is bent to stretch, and the upper side of the beam portion 4b is bent to be compressed. Therefore, the resistance of the strain gage 20a on the beam portion 4a increases, whereas the resistance of the strain gage 20b on the beam portion 4b decreases. Conversely, when the control portion 3 of the control member 2 is tilted down in the X2-direction, the upper side of the beam portion 4a is bent to be compressed, and the upper side of the beam portion 4b is bent to stretch. Therefore, the resistance of the strain gage 20a on the beam portion 4a decreases, whereas the resistance of the strain gage 20b on the beam portion 4b increases. In both cases, the voltage at the terminal T1 changes, and the apparatus to which the input device is connected is allowed to move the cursor in the X-axis direction.

In contrast, when the control portion 3 of the control member 2 is tilted down in the Y1-direction, the upper side of the beam portion 4c is bent to stretch, and the upper side of the beam portion 4d is bent to be compressed. Therefore, the resistance of the strain gage 20c on the beam portion 4c increases, whereas the resistance of the strain gage 20d on the beam portion 4d decreases. Conversely, when the control portion 3 of the control member 2 is tilted down in the Y2-direction, the upper side of the beam portion 4c is bent to be compressed, and the upper side of the beam portion 4d is bent to stretch. Therefore, the resistance of the strain gage 20c on the beam portion 4c decreases, whereas the resistance of the strain gage 20d on the beam portion 4d increases. In both cases, the voltage at the terminal T2 changes, and the cursor can be moved in the Y-axis direction.

When the control portion 3 of the control member 2 is pressed in the axial direction, it moves within a small clearance between the projection 9 and the mounting plate 1, so that the resistance of the resistor 21 is slightly changed. This changes the voltage at the terminal T3, and moves the cursor in the Z-axis direction.

In this way, the cursor is moved in the X-, Y-, and Z-axis directions in response to the movement of the control portion 3. During the operation of the control portion 3, static electricity dissipates to the mounting plate 1 via the shielding plate 29, and therefore, the conductive pattern 18, and the strain gages 20a, 20b, 20c, and 20d disposed on the control member 2 are protected from damage due to static discharge.

While the base portions 5a, 5b, 5c, and 5d are provided at the ends of the beam portions 4a, 4b, 4c, and 4d in the above embodiment, they may be connected to the control portion 3 of the control member 2 so as to form a cross, without the beam portions 4a, 4b, 4c, and 4d.

According to the input device of the present invention, the control member 2 is molded by injecting liquid synthetic resin from the inlet 11 into the mold 12 corresponding to the top of the control portion 3. The inlet 11 is positioned at about the center of the control member 2, and the liquid synthetic resin smoothly flows from the control portion 3 having a relatively large thickness toward the beam portions 4a, 4b, 4c, and 4d and the base portions 5a, 5b, 5c, and 5d that have a relatively small thickness. This allows a smooth flow of the liquid synthetic resin and ensures consistently high quality and high precision of the control member 2. In addition, fiber orientation is made uniform in the beam portions 4a, 4b, 4c, and 4d and the base portions 5a, 5b, 5c, and 5d. As a result, it is possible to provide an input device in which beam portions have good bending characteristics.

When the control member 2 is molded from a synthetic resin containing glass fiber, it is possible to provide an input device in which the creep properties of the beam portions 4a, 4b, 4c, and 4d and the base portions 5a, 5b, 5c, and 5d are good, and high-precision bending is achieved, and which is sufficiently resistant to heat for use in high-temperature environments and maintains good bending characteristics over a wide range of temperatures.

While the present invention has been described with reference to what is presently considered to be the preferred embodiment, it is to be understood that the invention is not limited to the disclosed embodiment. On the contrary, the invention is intended to cover various modifications and equivalent arrangements included within the spirit and scope of the appended claims. The scope of the following claims is to be accorded the broadest interpretation so as to encompass all such modifications, and equivalent structures and functions.

What is claimed is:

1. An input device comprising:

a control member having a columnar control portion having a top end and a bottom end, a plurality of beam portions each having a first end connected to the bottom end of said control portion so as to extend perpendicularly to an axis of said control portion, and a flat base portion connected to a second end of each of said beam portions; and a strain gage disposed on at least two of said beam portions, wherein said control member is molded from synthetic resin, said synthetic resin being injected into a mold that utilizes the top end of said control portion as an inlet so as to form the beam portions with similar bending characteristics.

2. An input device according to claim 1, wherein said control member is made of a synthetic resin containing glass fiber.

3. An input device comprising:

a control member having a columnar control portion having a top end and a bottom end, and a plurality of base portions each having an end connected to the bottom end of said control portion so as to extend perpendicularly to an axis of said control portion; and a strain gage disposed on at least two of said base portions, wherein said control member is molded from synthetic resin, said synthetic resin being injected into a mold that utilizes the top end of said control portion as an inlet so as to form the base portions with similar bending characteristics.

4. An input device according to claim 3, wherein said control member is made of a synthetic resin containing glass fiber.

* * * * *